United States Patent [19]
Arnaud et al.

[11] Patent Number: 5,485,064
[45] Date of Patent: Jan. 16, 1996

[54] SELF-SYNCHRONOUS MOTOR AND ELECTRICAL TRACTION SYSTEM USING A SELF-SYNCHRONOUS MOTOR

[75] Inventors: Georges Arnaud, Orsay; Claude Jacques, Chevreuse, both of France

[73] Assignee: Auxilec, Chatou, France

[21] Appl. No.: 49,130

[22] Filed: Apr. 19, 1993

Related U.S. Application Data

[63] Continuation-in-part of Ser. No. 961,373, Oct. 15, 1992.

[30] Foreign Application Priority Data

Oct. 23, 1991 [FR] France .................... 91 13126

[51] Int. Cl.⁶ ........................................ H02P 3/00
[52] U.S. Cl. .............................. 318/139; 318/690
[58] Field of Search ..................... 318/700, 704, 318/716–719, 721, 724, 138, 254, 139, 438, 140–141, 151–154, 690–695

[56] References Cited

U.S. PATENT DOCUMENTS

| | | | |
|---|---|---|---|
| 2,606,217 | 8/1952 | Raine et al. | 318/141 |
| 3,093,780 | 6/1963 | Tourneau | 318/154 |
| 3,573,578 | 4/1971 | Shibata. | |
| 3,631,273 | 12/1971 | Stein | 310/46 |
| 3,679,953 | 7/1972 | Bedford | 318/138 |
| 3,749,991 | 7/1973 | Kuniyoshi | 318/254 |
| 3,753,069 | 8/1973 | Newdon | 318/136 X |
| 4,004,203 | 1/1977 | Chalmers. | |
| 4,450,396 | 5/1984 | Thornton | 318/721 |
| 4,567,407 | 1/1986 | Ecklin | 318/138 X |
| 4,684,867 | 8/1987 | Miller et al. | 318/757 X |
| 5,053,662 | 10/1991 | Richter | 318/702 X |
| 5,075,610 | 12/1991 | Harris | 318/701 |
| 5,168,203 | 12/1992 | Tepavcevic | 318/701 |

*Primary Examiner*—David S. Martin
*Attorney, Agent, or Firm*—Roland Plottel

[57] ABSTRACT

A self-synchronous electrical motor comprises a rotor, a stator formed by stator windings, at least one electronic switch series-connected with a stator winding to control a mean current in the winding, a sensor of the angular position of the rotor to control the working of the switch. This electrical motor also comprises a rotating mechanical commutator or change-over switch device to shunt or route a current given by a power supply source into windings selected as a function of the position of the rotor. The commutator device is interposed in a series circuit formed by the power supply source, the stator windings and the electronic switch. Application to the industry of automobiles using electrical traction.

12 Claims, 6 Drawing Sheets

SELF-SYNCHRONOUS MOTOR AND ELECTRICAL TRACTION SYSTEM USING A SELF-SYNCHRONOUS MOTOR

This application is a continuation in part of Ser. No. 961,373 filed Oct. 15, 1992.

BACKGROUND OF THE INVENTION

1. Field of the Invention

The present invention relates to an electrical traction system notably for automobiles that is, in particular, a multifunction system integrating the main motor and brake generator function with the auxiliary charger and converter functions. It also relates more particularly a self-synchronous electrical motor that can be used notably in electrical traction systems for automobiles.

It is recalled that a self-synchronous motor is a motor in which there is produced a magnetic field rotating exactly at the same speed as the rotor, whatever may be this speed, i.e. especially when it is starting.

In the field of the technology of electrical traction systems for automobiles, there is the major problem of reducing the quantity and cost price of the raw material used as well as the number of electronic components used for the controls.

The aim of the present invention therefore is to provide an electrical traction system for automobiles that meets practical requirements more efficiently than do prior known traction systems of the same type, designed for the same purpose, notably inasmuch as this system is:

lighter, less costly, more efficient, more reliable, and at the same time meets regulatory standards and especially safety standards. The invention is also aimed more generally at improving electrical motors by reducing their cost.

The solution to the technical problem referred to here above is defined by means for the commutation of the stator windings of the electrical motor of the electrical traction system that is an object of the present invention enabling the performance by these same windings, as required, not only of their main motor/generator function but also of the auxiliary charger and/or converter functions.

2. Description of the Prior Art

Known self-synchronous motors comprise generally star-connected stator windings that are series-connected with electronic switches. These switches are activated at a frequency (that can be called a high frequency) which is far higher than the electrical frequency of the rotating magnetic fields generated at the stator; the (low) frequency of the rotating magnetic fields corresponds to the speed of rotation of the motor. The switches are used to chop the current at high frequency with a cyclical ratio that is variable so that it is possible, firstly, to control the value of the mean current in the stator windings during periodic time intervals (low frequency) when a current effectively flows in these windings and, secondly, to totally interrupt this current during other periodic time intervals (low frequency). With several stator windings and, hence, several electronic switches, it is possible to shunt or route the current successively (at low frequency) into the windings so as to create a rotating stator magnetic field. The envelope of variation of the mean current in a winding is defined by the variation of the cyclical ratio of the chopped current, which can be adjusted at will as a function of the waveform desired for the mean current. These self-synchronous motors use at least as many electronic switches as windings, and these electronic switches are costly especially if high currents go through them, which is the case with automobiles. The present invention is aimed at reducing the cost of the motor and increasing its reliability without lowering its performance characteristics.

SUMMARY OF THE INVENTION

The present invention proposes a self-synchronous electrical motor comprising a rotor, a stator with stator winding, at least one electronic switch that is series-connected with a stator winding and activated by a chopper circuit at high frequency to control a mean current in the stator winding, a sensor of angular position of the rotor to activate the chopper circuit. It comprises also a rotating mechanical commutator or change-over switch device driven by the rotor to shunt or route the current given by a power supply source into stator windings selected as a function of the position of the rotor. The mechanical commutator device is interposed in the series circuit formed by the supply source, the stator windings and the electronic switch.

This arrangement makes it-possible to limit the number of costly electronic switches while, at the same time, keeping the possibility of constantly controlling the amplitude of the mean current in the different windings. This makes it possible notably to check the evenness of the motor torque. Furthermore, unlike in electrical motors which work exclusively with mechanical commutators, the current can be cut off by electronic switches at the instants when the mechanical commutator device is switching over or commutating, thus preventing sparks in this device.

According to the invention, the stator of the motor preferably has a set of four star-connected windings offset by 90 electrical degrees with respect to one another, the commutator device being mounted between the power supply source and the free end of two of the windings, a respective electronic switch being mounted between the free end of each of the other two windings and the power supply source.

The commutator device is made out of rings and brushes that rub against the rings. The commutator device may comprise a first brush that is connected to the power supply source and that rubs constantly on a first ring driven by the rotor. Two other brushes, each connected respectively to a stator winding, rub alternately on a half-ring driven by the rotor and electrically connected to the first ring.

In another configuration, the commutator device may comprise a fixed ring connected to the supply source and two fixed half-rings; the first half-ring is connected electrically to a first winding and the second half-ring is connected electrically to a second winding. A dual brush driven by the rotor is designed for the alternate short-circuiting firstly of the ring and first half-ring and, secondly, of the ring and second half-ring.

So that the motor according to the invention can work as a brake generator, provision is made, preferably, to use a coiled rotor, set up a series connection, with the rotor, of an electronic switch associated with a chopper circuit and place a diode in parallel with each of the electronic switches in series with the stator windings. The electronic switch of the rotor enables the control of the mean rotor current so as to generate, in the stator windings, counter-electromotive forces with an amplitude that is greater than the voltage of the supply source. The diodes parallel-connected with the electronic switches let through the stator currents only in the direction of the charging of the power supply source.

The invention also relates to an electrical traction system, notably for automobiles, using a self-synchronous motor (with or without a mechanical commutator device), supplied by a rechargeable current supply source, with means to recharge the source that use one or more electronic switches of the motor.

This electrical traction system then comprises a rechargeable supply source, a self-synchronous motor provided with a stator and a rotor, with windings that are crossed by a current coming from the source to make the motor run and electronic switches to control the mean current in the windings when the motor is in operation. This traction system comprises also means to recharge the supply source that use at least one first winding forming the primary winding of a transformer and at least one second winding forming the secondary winding of the transformer and rectifier means connected between the secondary winding and the source to let through a current in one direction of recharging of the source. At least one electronic switch is series-connected with the primary winding.

There is consequently no need for power supply recharging circuits distinct from those used to make the motor work. It is possible to use electronic switches that are already present in the motor and are particularly costly. The primary winding is connected to an energy source, the motor being at a stop.

This traction system preferably uses an asynchronous motor having both electronic switches and a rotating mechanical commutator or change-over switch device that shunts or routes the current into the stator windings.

The invention also relates to an electrical traction system, notably for automobiles, using a self-synchronous motor, the stator of which has stator windings that enable the motor to be made to function. The stator comprises at least one additional winding that is electromagnetically coupled to the stator windings and a rectifier circuit, connected between the additional winding and a rechargeable auxiliary battery, to recharge the auxiliary battery.

There is no need for a generator or alternator to recharge an auxiliary battery such as this. Nor is it necessary to use a part of the power supply source of the motor as an auxiliary battery, an approach that would be detrimental to the balance among the different batteries that generally form the power supply source of the motor.

The invention also relates to an electrical traction system, notably for automobiles, comprising a rotating self-synchronous motor with stator provided with windings and at least one electronic switch activated by a chopper circuit to control a mean current in a stator winding, this mean current being given by a rechargeable source. This traction system also comprises means to recharge an auxiliary battery, means to recharge the rechargeable power supply source, means used to reverse the direction of rotation of the motor, all these means using at least the electronic control switch.

More generally, an object of the present invention is a traction system for an automobile, such as a car, truck, bus, scooter or moped, comprising:

at least one electrical generator, notably an electromechanical generator (constituted, in this case, by a thermal motor for the driving of a generator, especially an AC generator) and/or an electrochemical generator, constituted by at least one accumulator and/or at least one fuel cell;

at least one electrical machine that is reversible (namely a machine capable of working as a motor and brake generator and hence capable of carrying out notably the function of electrical traction in motor operation) said electrical machine being of the self-synchronous type, comprising:

a stator provided with at least one polyphase winding comprising a given number of stator windings (E1, E2, E3, E4; e1, e2, e3, e4) which correspond to the different phases and are spatially offset, and a device for sequential commutation from one phase to another enabling the generation of a shift in time, between the currents designed to flow in the different stator windings, said shift being necessary for the creation of a rotating stator magnetic field, and a coiled rotor, namely one comprising at least one rotor winding (E5, E6) designed to be crossed by a direct current for the creation of a magnetic flux defining the rotor field;

at least one charger carried in the system, said charger being designed to recharge at least one main supply battery (Vp);

at least one converter of the high-voltage direct current, corresponding to said main supply battery (Vp), into a low-voltage direct current designed for the supply and recharging of a standard auxiliary battery (Vs), the voltage of which is notably 6 V or 12 V, said electrical traction system being one wherein the means for the commutation of the stator windings (E1, E2, E3, E4) and of the main semiconductor components of the power electronic circuitry for the control of the self-synchronous machine (said windings and said components being necessary for its basic or main operation as a motor and as a brake generator) provide for the reconfiguration of said windings and said components in at least one auxiliary mode of operation, corresponding notably to said charger and/or to said converter, thus enabling the reduction of the number of the windings and of the semiconductor components needed to carry out said auxiliary operation.

According to a first advantageous embodiment of the electrical traction system according to the invention:

the stator comprises star-connected first, second, third and fourth windings (E1, E2, E3, E4) that are spatially offset by 90/p mechanical degrees (2p being the number of magnetic poles of the self-synchronous machine) and are connected two by two so as to define a first group and a second group of windings (E1, E2, E3, E4), of which the first group comprises said first and third stator windings (E2, E3) while the second group comprises said second and fourth windings (E2, E4) so that the windings (E1, E3) of said first group as well as the windings (E2, E4) of said second group are offset with respect to one another by 180 electrical degrees while the first and second windings (E1, E2) as well as the third and fourth windings (E3, E4) are offset with respect to one another by 90 electrical degrees;

the above-mentioned commutation means comprise first, second, third and fourth choppers (a, A, b, B) that are mounted in series respectively with said first, second, third and fourth windings (E1, E2, E3, E4) and are controlled sequentially two by two (a, A; b, A; b, B; a, B) b, B) during commutation, i.e. the commutation of the first and second choppers (a, A) is actuated, then the commutation of the third and second choppers (b,A) as well as that of the third and fourth choppers (b, B), and this is followed by the commutation of the first and fourth choppers (a, B), to enable the sequential shunting or routing of the stator current (Ist) in the stator windings combined two by two, i.e. respectively in the first and second windings (E1, E2), the third and second windings (E3, E2), the third and fourth windings (E3, E4), as well as in the first and fourth windings (E1, E4), said second and fourth choppers being also controlled in modulation to set the value of said stator current.

According to a preferred arrangement of this embodiment, said first and third choppers (a, b) are mechanical, two-way commutation or switch-over means formed by means of a ring (B1) as well as a first half-ring and a second half-ring (B2, B3), the first half-ring (B2) being electrically connected to the ring (B1) while the second half-ring (B3) is electrically insulated from the ring (B1) as well as from the first half-ring (B2).

According to an advantageous modality of this arrangement, said ring (B1) and half-rings (B2, B3) are mounted on the rotor axis (x—x) of the self-synchronous machine and respectively slide on first, second and third fixed brushes (b1, b2, b3).

According to an advantageous variant of this modality, said ring (B1) and half-rings (B2, B3) are fixed and come into sliding contact with a double brush (bt) rotating about the rotor axis, within said ring (B1) and half-rings (B2, B3).

According to an alternative embodiment of said arrangement, said first and second choppers (a, b) are semiconductor-based two-way commutation means and are controlled by the sensing of the angular position of the rotor with respect to the stator.

According to a second arrangement, each of said second and fourth choppers (A, B), in motor and brake generator mode of operation, is a semiconductor-based two-way commutation means.

According to an advantageous modality of this second arrangement, each of said second and fourth choppers (A, B) uses a diode (d) in motor operation mode, the control of the stator current (Ist) being achieved in this case by a control of the rotor current (Iro).

According to other advantageous arrangements in conformity with the invention:

- in motor operation, said second and fourth choppers (A, B) are respectively protected by a first diode and a second diode, known as "free wheel" diodes (d1, d2) each connected in parallel with said first and second windings (E1, E2) and, respectively, said third and fourth windings (E3, E4);
- in generator operation, the reversal of the direction of flow of the current in the stator windings (E1, E2, E3, E4), with respect to the direction of flow of the current in motor operation, is controlled respectively by a third diode and a fourth diode (d3, d4) each series connected with said second winding (E2) and, respectively, said fourth stator winding (E4);
- the rotor current (Iro) in the rotor winding (E5) is controlled by a fifth one-way chopper (C) protected by a fifth diode (d5).

According to another preferred embodiment of the electrical traction system according to the invention, the means for commutation from the motor/brake generator operation to the charger operation comprise:

- a first contact (c1), which works in a closed state in the motor operation mode and in an open state, respectively, in the charger operation mode and is in series with said first chopper (a);
- a second contact (c2) which itself also works in a closed state in the motor operation mode and in an open state, respectively, in the charger operation mode and is in series with said third chopper (b);
- a third contact (c3) that is mounted on the "center" of the star connection of the stator windings (E1, E2, E3, E4) and works in a closed state in the motor operation mode and hence works in an open state in the charger operation mode;
- a fourth contact and a fifth contact (c4, c5) which work respectively in an open state and in a closed state in motor operation mode and hence respectively in a closed state and in an open state in the charger operation mode, and which connect the cathode of the fourth diode (d4) respectively to the input and the output of said first and fourth stator windings (E1, E4).

wherein said contacts (c1 to c5) make it possible to change the connections between the stator windings (E1, E2, E3, E4) and the corresponding electronic components in such a way that when said contacts work in the direction corresponding to the charger operation, they enable, by the opening of the first, second and third contacts (c1, c2, c3), firstly the series connection of said third and fourth stator windings (E3, E4) to each other to constitute the primary winding of a transformer and, secondly, the series connection of said first and second windings (E1, E2) to each other to constitute the secondary winding of said transformer while, by the closing and opening respectively of said fourth and fifth contacts (c4, c5), said first, second, third and fourth diodes (d1, d2, d3, d4) are connected to one another in such a way as to constitute the elements of a rectifier bridge that is connected to said secondary winding (E1+E2) of the transformer and is designed to recharge the main battery, when the electromotive force is greater than the supply voltage;

wherein the charging current of this battery is controlled in the primary winding (E3+E4) of said transformer by sixth and seventh choppers (D, E); and wherein a sixth contact (c6) which works in a closed state in motor operation mode and hence in an open state in the charger operation mode, provides, in conjunction with said second, third and fifth contacts (c2, c3, c5), for the insulation of the primary winding of the transformer from the secondary winding of said transformer, and hence insulates the mains supply from the battery (Vp).

According to an advantageous arrangement of this embodiment, at least one of said fifth and sixth choppers (D, E) is constituted, in the charger operation, by one of said second and fourth choppers (A, B) used in the motor/brake generator operation mode.

According to another preferred arrangement of this other embodiment, the stator of the self-synchronous machine comprises fifth, sixth, seventh and eighth additional stator windings (e1, e2, e3, e4) connected in series to each other and respectively coupled to said first, second, third and fourth main stator windings (E1, E2, E3, E4) so that, irrespectively of the working condition of said contacts (c1 to c6), i.e. irrespectively of the operation at the outset, whether in motor/brake generator operation mode or in charger operation mode, said additional stator windings (e1, e2, e3, e4) constitute the secondary winding of a transformer which enables the conversion, after rectification by sixth and seventh diodes (d6, d7) and control by a charging regulator (Rch), of the high-voltage direct current of the main battery (Vp) into a low-voltage direct current designed for the supply and recharging of a conventional auxiliary battery (Vs).

According yet another arrangement in conformity with the invention, the rotor comprises an additional rotor winding (E6) which is connected between said ring (B1) and first half-ring (B2) and uses the presence in the rotor of the stator current (Ist) to thus increase the ampere-turns of the main rotor winding (E5), the protection of said second and fourth choppers being done by a sixth diode (d6), known as a "free wheel" diode, parallel connected with said additional rotor winding (E6).

BRIEF DESCRIPTION OF THE DRAWINGS

Other features and advantages of the invention shall appear from the following description, made with reference to the appended drawings, of which:

FIG. 3b shows a traction system according to the invention similar to that of FIG. 2b but with, in addition, the elements that enable the performance of the converter function described in FIG. 3a.

FIG. 4 shows a graph as a function of time illustrating the working of the electronic switches and of the mechanical commutators of the motor of FIG. 1a;

MORE DETAILED DESCRIPTION

The following is a detailed description of the basic operation in motor mode and in brake generator mode as well as the auxiliary operations in charger mode and in converter mode. At the same time, this description takes account of conditions specific to the direction of operation, to the control of the speed and of the torque and to the choppers. Furthermore, a description is given of a promising version of compounding which is capable of being used in the context of the present invention. In this description, the case taken, by way of an example, is that of an self-synchronous electrical traction machine with four stator windings and two poles, with coiled rotor.

I. DESCRIPTION OF OPERATION IN MOTOR MODE

Figure 1A:
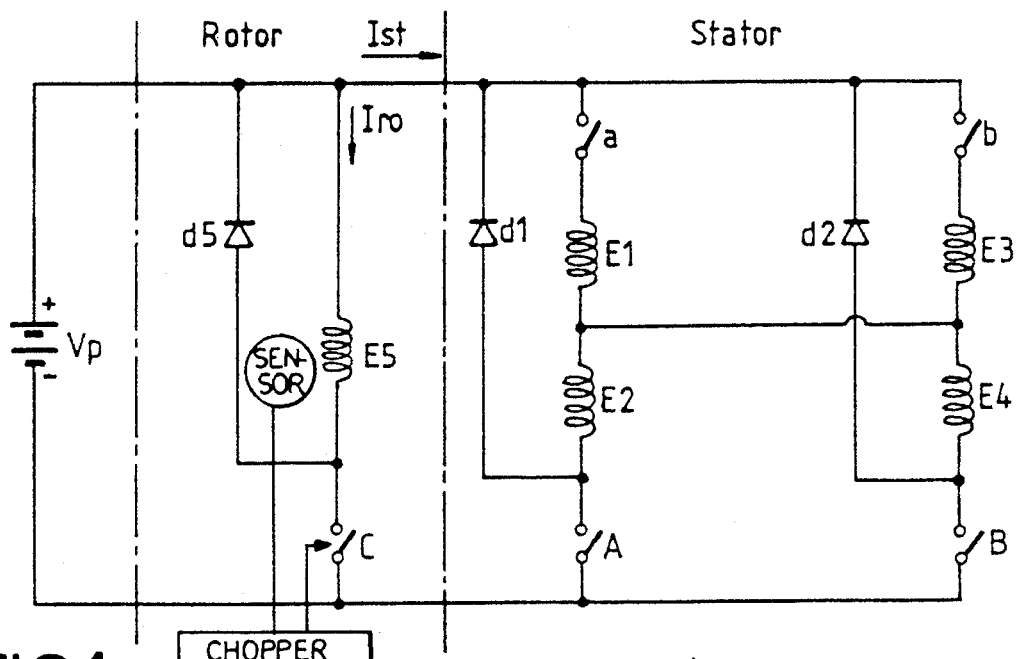
FIG. 1a shows an electrical circuit of a motor according to the invention, with solely the circuit elements that provide for the working of the motor.
Figure 1B:
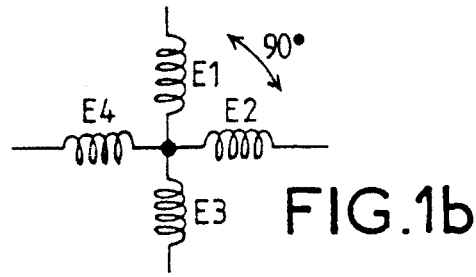
FIG. 1b shows the relative orientation of the stator windings of the motor according to the invention.

Reference is made to figures 1a and 1b. The only elements shown in figure 1a are the circuit elements used during the operation in motor mode. The circuit shown comprises a coiled rotor E5 and a stator with four windings E1, E2, E3 and E4. The rotor may be a rotor that is not coiled and that works with permanent magnets. The four stator windings E1, E2, E3, E4 of the drawing of figure 1a are star-connected.

E1 and E3, E2 and E4 are offset with respect to each other by 180 electrical degrees while the windings E1 and E2 (and hence E3 and E4) are offset with respect to each other by 90 electrical degrees (see FIG. 1b). FIG. 1b is shown in the motor configuration where the windings are all connected to a common midpoint. It will be seen further below that a manual switch enables the disconnection, in charger mode, of the pair of windings E1, E2 from the pair E3, E4. The windings E1 and E3 are connected to a first terminal of a power supply source VP which, in this case, is the positive terminal of an accumulator or battery. The windings E2 and E4 are connected to a second terminal of the supply source VP. The rotor winding, series-connected with an electronic switch C, is mounted at the terminals of the supply source VP.

A commutator device a,b and a pair of electronic choppers A, B enable the control and routing of the currents into the stator windings. Through the successive routing, by means of the commutator device a, b, of the stator current Ist coming from the supply source VP towards the windings E1+E2, E3+E2, E3+ E4, E1+E4, a stator rotating field is created.

The mechanical commutator device formed by two commutators a and b is inserted between the first terminal of the supply source VP and the windings E1 and E3 respectively. The choppers A and B are inserted between, respectively, the windings E2 and E4 and the second terminal of the power supply source VP.

The choppers A and B provide for control of the value of said current by an appropriate modulation. The frequency of the choppers is far higher than the frequency of commutation of the commutator device, the latter frequency corresponding to the rotational speed of the rotor. The control of the value of the mean current in the windings is essentially achieved by the modulation of the cyclical ratio of the turning on of the choppers. The choppers A and B are electronic switches (bipolar transistors, MOSFETs, IGBTs, thyristors, etc.) controlled by a chopper circuit (not shown). There are known ways of making chopper circuits that can be used to set up desired mean current waveforms. The choppers may be two-way choppers (thyristors upside down to each other, triacs etc.) to obtain certain modes of operation.

In the case of the motor of figure 1a, the choppers A and B furthermore fulfil a function of routing of the stator current needed for the creation of the rotating stator field.

Figure 4:
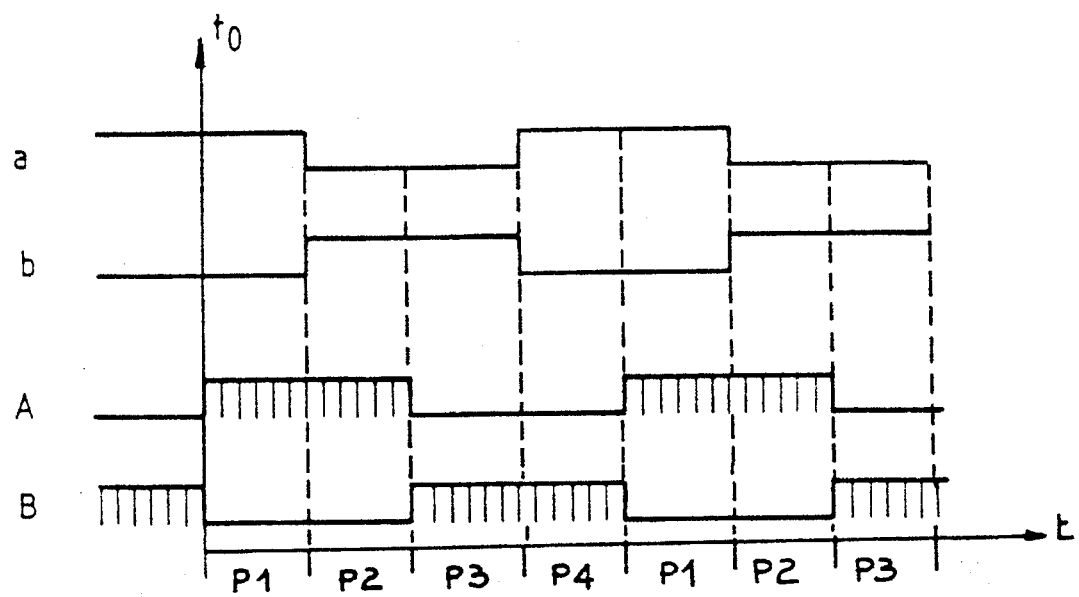

For example, when the commutator a is closed (the commutator b is open) to supply the winding E1, in a first phase P1 (low frequency) there will be a chopping of the current at high frequency by the switch A, the switch B being open; then, in a second phase P2 (low frequency), there will continue to be a chopping by the switch A, the switch B being open while the commutator a will be open (b closed). In a third stage P3 (low frequency) the commutator a will still be open (b closed) and there will be a chopping of the current at high frequency by the switch B, the switch A being open. In a fourth phase P4 (low frequency), there will continue to be a chopping by the switch B, the switch A being open, while the commutator a will be closed and b open. FIG. 4 illustrates this succession of phases. During the phase P1, the windings E1 and E2 are excited, then it is the windings E2 and E3 that are excited during the phase P2, then it is the windings E3 and E4 that are excited during the phase P3, and finally it is the windings E1 and E4 that are excited during the phase P4.

The windings E1, E2, E3, E4 are the seat of alternating counter-electromotive forces, the amplitude of which, in motor mode operation, is lower than the supply voltage VP of the battery.

The commutator device a and b is mechanical and is made with a ring/brush assembly. It is driven by the rotor. It therefore carries out a routing of the stator currents in synchronism with the rotation of the rotor. This successive routing in the windings produces the rotating stator magnetic field synchronized with the speed of rotation of the rotor.

Diodes d1 and d2, known as "free wheel" diodes, protect the choppers A and B in sustaining the passage of current in the windings until the natural extinction of this current in these windings. The diodes d1 and d2 are each mounted in parallel with, respectively, the pairs of windings E1, E2 and E3, E4. The electronic control of the choppers A and B is synchronized with the rotation of the rotor. It is such that the stator magnetic field is maintained in phase quadrature with respect to the rotor field to give a maximum torque. This is achieved by means of sensors of the angular position of the rotor. The choppers A and B therefore control the value of the stator current as a function of the angular position of the rotor and as a function of the desired torque (this control can be achieved by any possible type of modulation, including PWM modulation). More specifically, given that the stator currents are activated as a function of the position of angular position of the rotor, this position is detected so as to enable the activation, after processing in a processor, of the choppers A, B to optimize the working and efficiency of the motor.

The control of the stator current by the choppers A and B is preferably such that, during the routing of the current from one winding towards another one by the commutators a and b of the mechanical commutator device, the current is zero in the windings. The risks of sparks in the commutator device are reduced or even eliminated and the wearing out of the brushes of the commutator device is reduced.

A chopper C is inserted between the rotor winding E5 and a terminal of the supply voltage VP. A free wheel diode in parallel with the winding E5 ensures the protection of the chopper C.

The current Iro of the rotor winding E5, controlled by the chopper C and protected by the diode d5, ensures the creation of the rotor field. The chopper C is a one-way electronic switch. It may be formed by a transistor activated by means of a chopper circuit (not shown) at high frequency with a cyclical ratio variable so that it is possible to control the value of the mean current in the rotor winding E5. Its activation is comparable to that of the choppers A and B.

II. DESCRIPTION OF THE OPERATION IN BRAKE GENERATOR MODE

Of course, in this mode of operation (FIG. 1c), it is assumed that the machine is rotating.

Figure 1C:
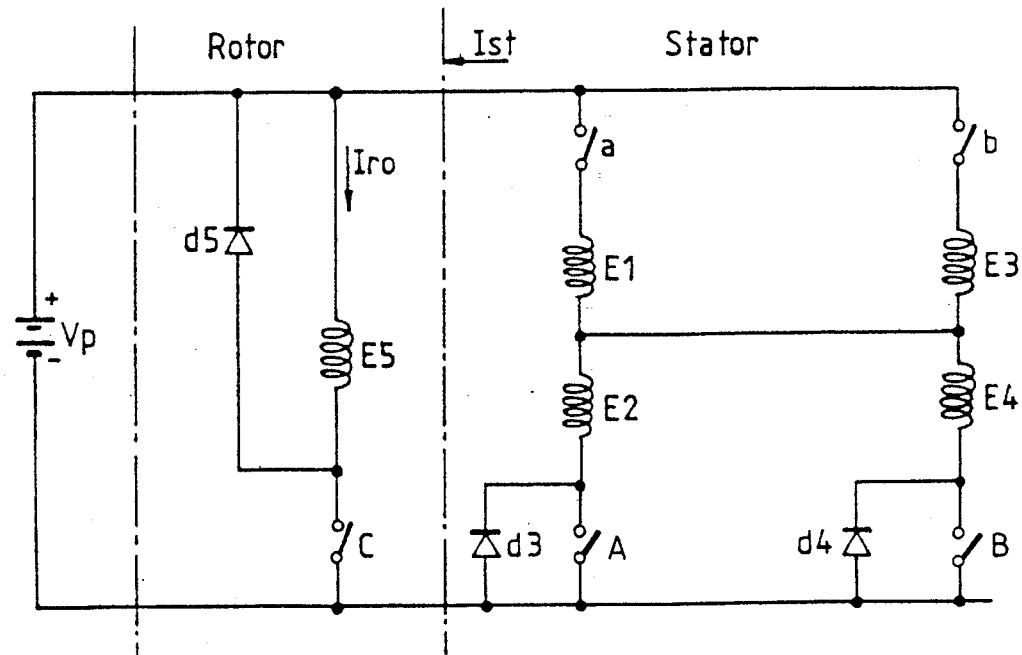
FIG. 1c shows the electrical diagram of the circuit elements that provide for the operation, in brake generator mode, of the motor according to the invention.

Reference is made to FIG. 1c. The only elements shown in this figure are the circuit elements used during the operation in brake generator mode. In brake generator operation, the two choppers A and B are off. Nor are the free wheel diodes d1 and d2 shown. Two diodes d3 and d4 are parallel-connected respectively with the chopper A and the chopper B. They let current pass through the stator windings only in the direction that is the reverse of the direction in motor operation. The value of the mean rotor current Iro is increased by the increasing of the cyclical ratio of conduction of the chopper C (while remaining in the zone of non-saturated operation of the motor) so that the electromotive forces arising at the terminals of the stator windings (E1+E2, E2+E3, E3+E4, E4+E1) have an amplitude which is greater than the voltage of the supply source VP. These forces create a current in the stator windings which can flow only in the direction of charging of the supply source because of the diodes d3 and d4.

The control of this charging current is achieved by the control of the rotor current Iro, as indicated here above.

The superimposing of the FIGS. 1a and 1c provides for the double operation in motor and in brake generator modes.

It is also possible to envisage a case where the diodes d3 and d4 are replaced by an electronic chopper enabling the control of the stator current in operation in brake generator mode. The choppers A and B would then be two-way choppers (as in FIG. 5b) rather than one-way choppers (as in FIG. 5c).

III. DESCRIPTION OF THE OPERATION IN CHARGING MODE

Figure 2A:
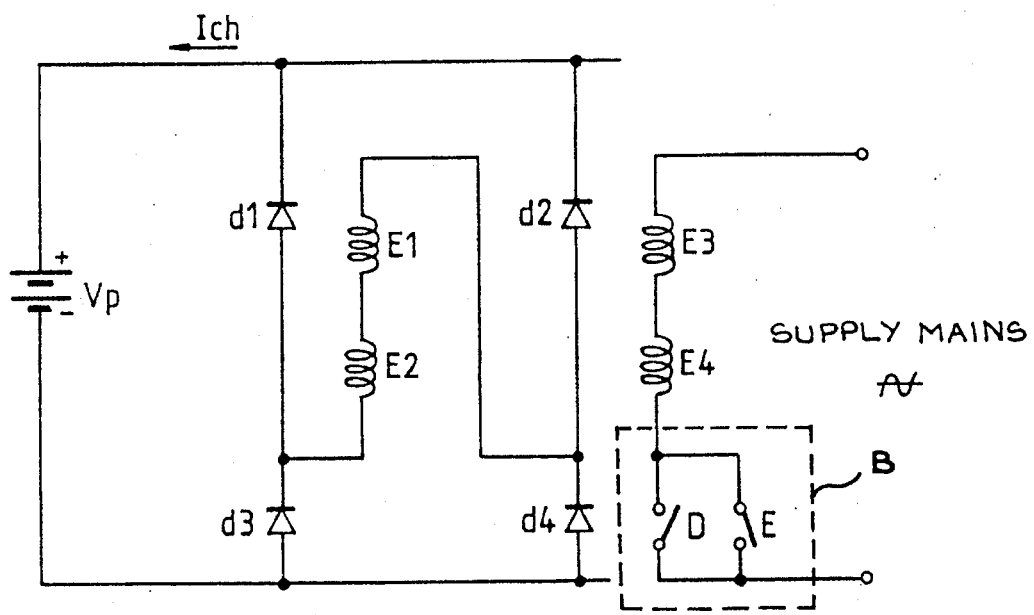
FIG. 2a shows the circuit elements that fulfil a charger function according to the invention.

FIG. 2a shows the circuit elements that fulfil a charging function. It uses a self-synchronous motor that may be of the type shown and described in figures 1a and 1c. In charging operation, the motor is off.

Figure 2B:
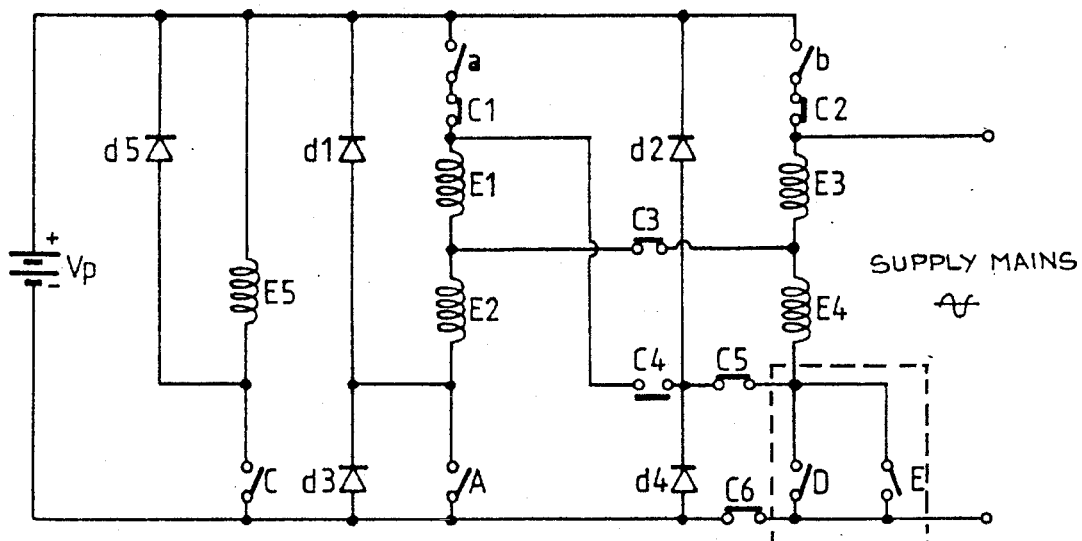
FIG. 2b shows a traction system according to the invention, with all the circuit elements that fulfil the motor, generator and charger functions described in the foregoing figures.

In the diagram shown in FIG. 2a, it is assumed that the connections of the different components have been reconfigured and that the rotor winding (which has not been shown) has been disconnected for it does not come into play. FIG. 2b shows the traction system used by the motor of FIGS. 1a and 1c. Hand-operated contacts c1 to c6 have been added. They are used to reconfigure the connections of the different windings and components when it is desired to change from operation in motor or brake generator mode to operation in charger mode. In this FIG. 2b, the contacts shown c1 to c6 correspond to their position in motor operation mode (c1, c2, c3, c5, c6 closed, c4 open) with the mains connector (to the right in the figure) being not connected while in the reverse position (c4 closed, the other contacts open) these contacts correspond to the charging function (the mains connector being connected in this case).

Reference is now made to FIG. 2a. The windings E1+E2 and E3+E4, which respectively constitute the secondary and the primary windings of a transformer, are shown again. The series-connected windings E3 and E4 are connected to the mains. The chopper B is is series-connected with the windings E3 and E4. The chopper A is off. It is not shown. This figure also shows the free wheel diodes d1 and d2 as well as the diodes d3 and d4 which are used in brake generator operation. The chopper B has been shown in the form of two switches D, E to indicate that it is a two-way chopper if it is sought to obtain operation in charging mode with the windings E3, E4 as the primary supplied by the AC mains.

The diodes d1, d2, d3, d4 constitute the elements of a rectifier bridge connected to the secondary winding E1 and E2. The series-connected windings E1 and E2 are connected between the two end of a first diagonal of the rectifier bridge. The supply source VP is connected between the two ends of a second diagonal of the rectifier bridge. If the electromotive force created at the terminals of the windings E1 and E2 has an amplitude greater than the amplitude of the supply source VP, then the current generated in the stator windings E1 and E2 will flow in the direction of the charging of the supply source by means of the diodes of the rectifier bridge. The mean charging current is controlled at the primary winding E3+E4 by the chopper B.

Reference is now made to FIG. 2b which represents the motor with all the commutators enabling it to be made to work in charger mode when it is at a stop. The first contact c1, which is open in charger operation and closed in motor or brake generator operation is series-connected between the winding E1 and the commutator a. The second contact c2, which is open in charger operation mode and closed in motor or brake generator operation mode is series-connected between the winding E3 and the commutator b. The third contact c3, which is open in charger operation and closed in motor and brake generator operation, is mounted at the center of the star connection, i.e. it has one end connected to the common point between the windings E1 and E2 and the other end connected to the common point between the windings E3 and E4. The fourth contact c4, which is closed in charger operation and open in motor and brake generator operation, is mounted between the cathode of the diode d4 and the common point between the winding E1 and the first contact c1. The fifth contact c5, which is open in charger operation and closed in motor and brake generator operation, is mounted between the cathode of the diode d4 and the common point between the winding E4 and the chopper B. The sixth contact c6, which is open in charger operation and closed in motor and brake generator operation, is mounted between the chopper B and the chopper A.

The fact of opening the contact c1 and of closing the contact c4 enables the windings E1 and E2 to be connected to the rectifier bridge. The fact of opening the contacts c2, c3, c5 and c6 makes it possible to constitute the primary winding of the transformer.

It is possible to envisage the use, in this traction system, of a self-synchronous motor that has not mechanical commutators but rather electronic commutators although the approach using mechanical commutators is preferable. It is also possible to envisage a case where the rotor is one with permanent magnets.

IV. DESCRIPTION OF OPERATION IN CONVERTER MODE

Figure 3A:
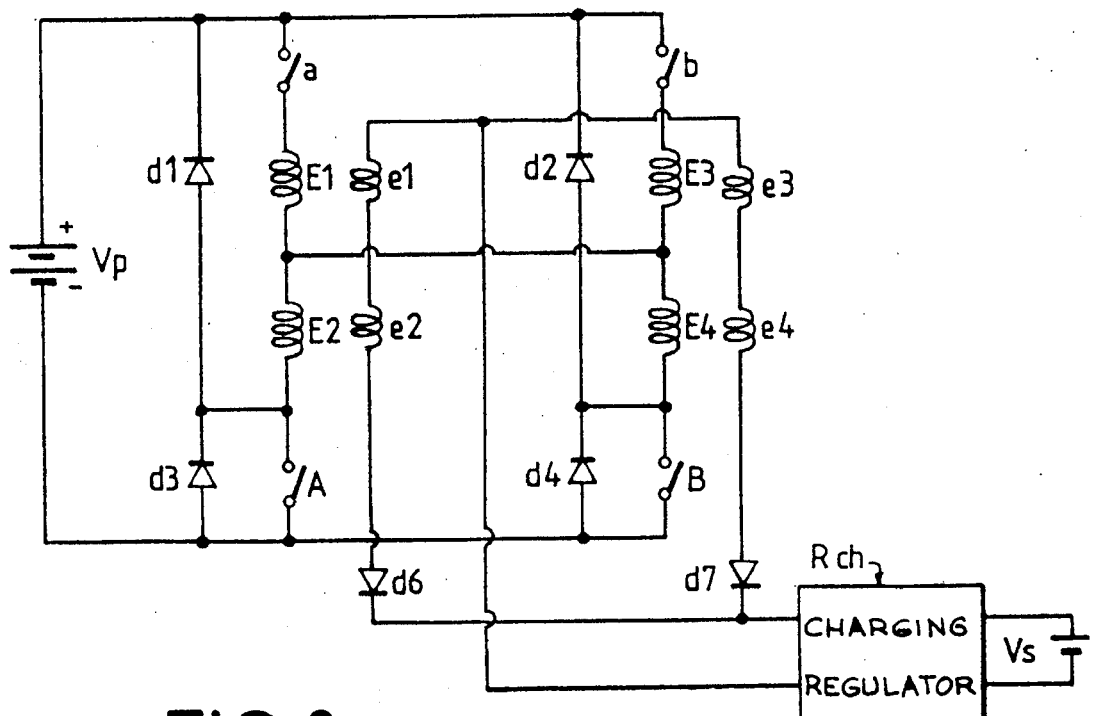
FIG. 3a the circuit elements that fulfil a converter function.

FIG. 3a shows the diagram of an electrical traction system with a converter function according to the invention. The converter function makes it possible to recharge an auxiliary battery Vs used for other purposes than for the working of the motor itself. For example, in the operation of an electrical vehicle, many electrical functions have to be carried out by an auxiliary battery (headlights, lighting up the dashboard etc.). It is preferable not to take the energy needed for these functions from the general power supply source VP.

Figure 3B:
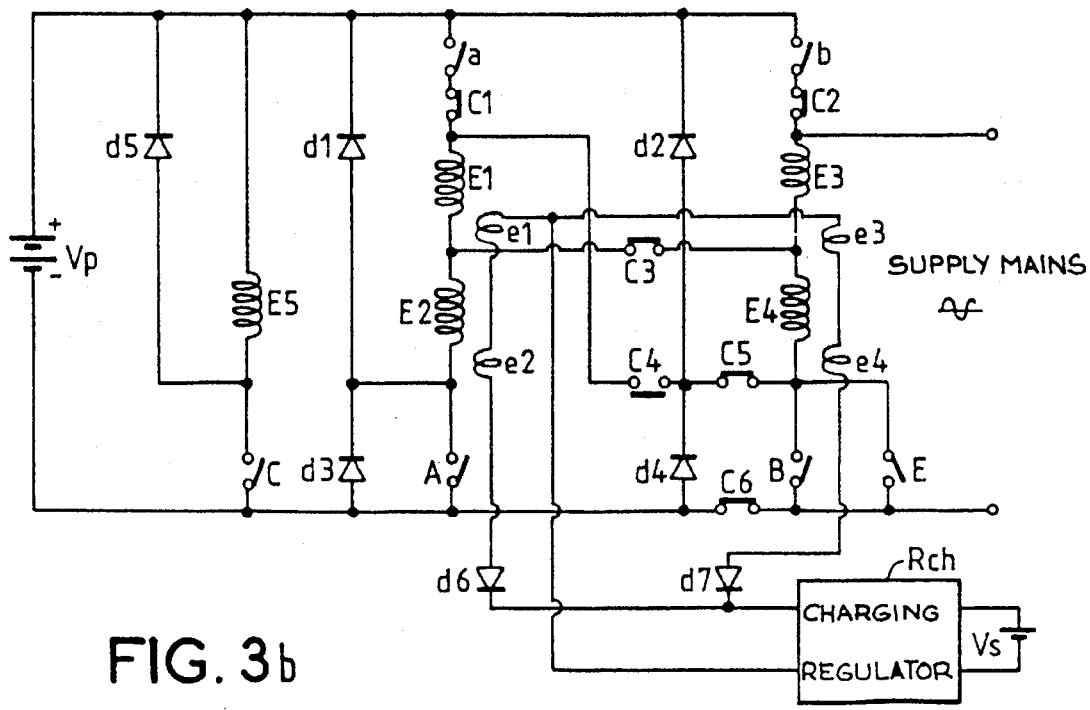

If, in the diagram of the operation in motor/generator mode, there are placed four windings e1, e2, e3, e4, respectively coupled to the windings E1, E2, E3, E4 as shown in the diagram illustrated in FIG. 3a, these windings constitute the secondary winding with midpoint of a transformer which, if they are properly sized according to the standards of workmanship known to those skilled in the art, may (after rectification by the diodes d6, d7 and control by a charging regulator Rch) constitute the low-voltage converter parallel-connected with the standard auxiliary battery Vs (normally 6 or 12 V). The windings E1, E2, E3, E4 constitute the primary winding of the transformer. The schematic diagram of FIG. 3b brings together the circuit elements of FIG. 2b (pertaining to the motor capable of working in brake generator mode) and the elements of FIG. 3a specific to the operation in converter mode. In this FIG. 3b, the contacts c1 to c6 are shown in the position corresponding to the motor/brake generator mode of operation (as in FIG. 2b). However, it is clear that the converter mode of operation may also be obtained from the same contacts c1 to c6 in the position corresponding to the charger mode of operation. This amounts to saying that the converter mode of operation can be obtained either with the self-synchronous motor turned on or with this motor off.

V. CONTROL OF THE DIRECTION OF OPERATION

To reverse the operating direction of the motor, it is enough to reverse the chopping phases of the choppers A and B with respect to the phases of commutation of the mechanical device (a,b).

In the case of FIG. 4, we successively have the excitation of the windings E1+E2, E3+E2, E3+E4, E1+E4. The reversal of the phases of the choppers B and A would lead to the following sequencing: E1+E4, E3+E4, E3+E2, E1+E2, thus showing the reversal of the direction of rotation. Instead of the succession of the phases P1, P2, P3, P4, there could be the succession of the phases P4, P3, P2, P1.

VI. CONTROL OF THE SPEED AND OF THE TORQUE

The control of the speed and of the torque is done by means of dual action on the rotor and stator currents.

This dual action, if it is perfectly controlled (by means of digital control by a processor in real time) and if it is done with maximum efficiency, makes it possible to cover the entire range of torque/speed operation of the traction motor in the different uses to which it is put.

VII. OPERATION OF THE CHOPPERS

Figure 5A:
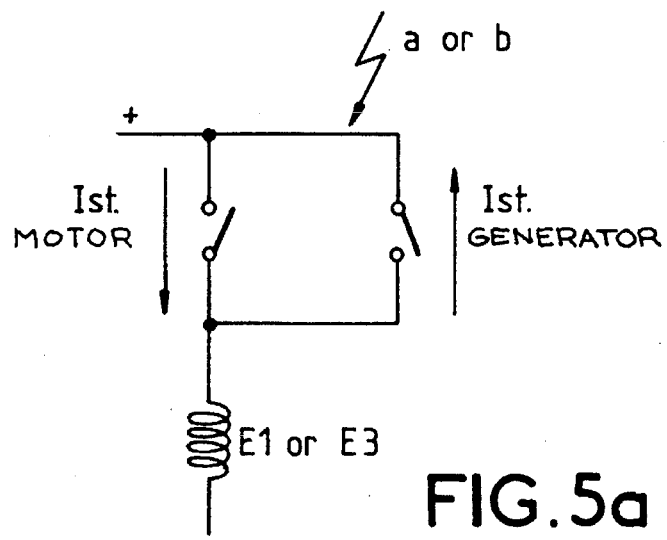
FIG. 5a shows the mechanical commutators of the motor.
Figure 5B:
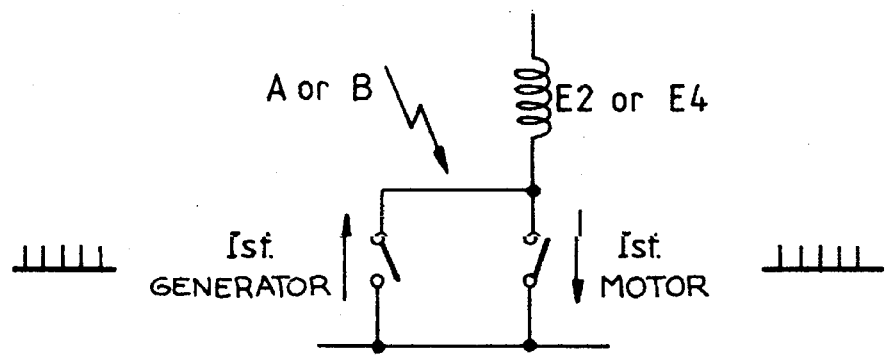
FIGS. 5b, 5c show the electronic switches of the motor.

The choppers A and B in motor and generator operation are two-way switches. One of these choppers is shown in FIG. 5b. They may be made with bipolar transistors, MOSFETs, IGBTs or thyristors.

These switches are electronic and, in addition to the routing of the stator current into the windings E2 and E4, they provide for the control of the value of this current as a function of the angular position of the rotor and as a function of the desired torque (this control can be done for all the possible types of modulation, including the PWM modulation). More specifically, given that the control of the stator currents is a function of the angular position of the rotor, this position is detected by means of angular position sensors so as to enable, after processing in a processor, the control of the choppers in switching and modulation to optimize the operation and the efficiency of the motor and of the brake generator.

Figure 5C:
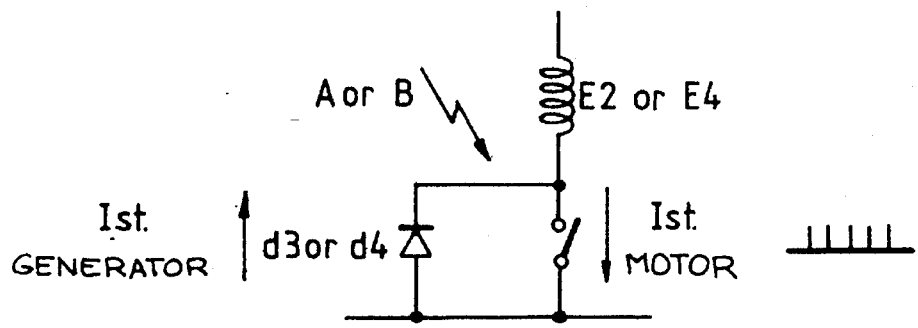

A variant which can be seen in FIG. 5c uses a diode that is on for the operation in generator mode. In generator mode, the chopper (A or B) which is parallel-connected with the diode is off. In motor mode, the chopper is used and the diode is off. In generator mode, the control of the stator current is done, in this case, by a control of the rotor current.

VIII. MECHANICAL CHOPPERS a, b

Figure 6A:
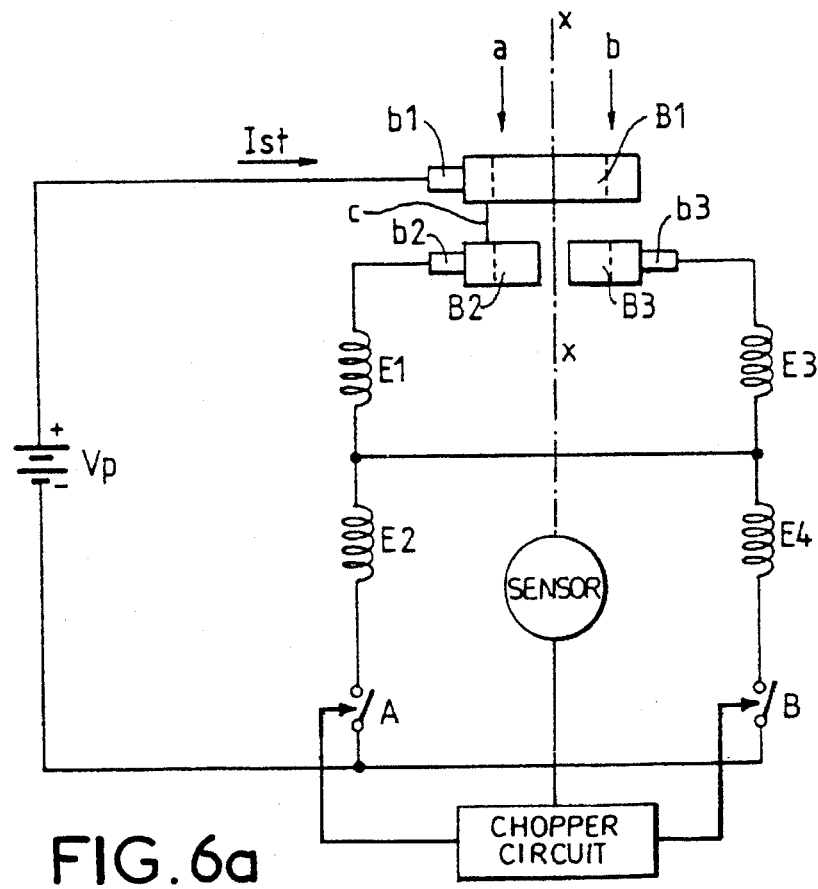
FIGS. 6a, 6b show two particular embodiments of the motor of FIG. 1.
Figure 6B:
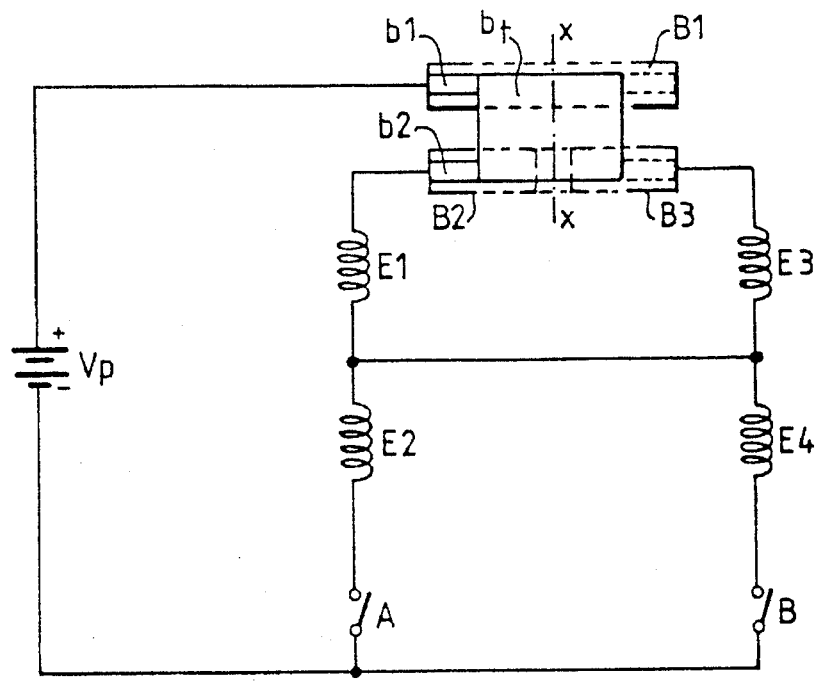

The commutators a and b are two-way commutators. FIG. 5a illustrates this. The shunting of the stator current can be done by means of rings and brushes. FIGS. 6a and 6b shows two exemplary embodiments of the rotating mechanical commutator device.

FIG. 6a

In FIG. 6a, the stator current passes from the fixed brush b1, by sliding contact, to a rotating ring B1 which is connected (connection c) to a half-ring B2 that is fixedly joined, like B1, to the rotor; then by the fixed brush b2, the stator current is supplied to the winding E1 (the half-ring B3 is insulated from the half-ring B2 and from the ring B1). The fixed brush b1 is connected to the supply source VP. The fixed brush b2 is connected to the winding E1.

After a half-turn rotation, the half-ring B2 supplies the winding E3 by means of the fixed brush b3. The fixed brush b3 is connected to the winding E3. The brush b2 is no longer supplied. The brushes b2 and b3 rub alternately on the half-rings B2 and B3.

The electronic control of the current by the choppers A and B may be such that the currents cut off by the brushes are zero to limit the wear and tear thereof. The risks of sparks in the brushes are greatly reduced Variant FIG. 6b In this variant, a rotating double brush bt ensures the short-circuiting, successively, during its rotation, of the fixed ring B1 and the fixed ring B2 thus supplying the winding E1, then a half-turn later it short-circuits the fixed ring B1 and the fixed half-ring B2, thus supplying the winding B2. The brush bt is driven rotationally by the rotor. During its rotation, it ensures the AC supply of the winding E1 and of the winding E3.

IX. COMPOUNDING

Figure 7:
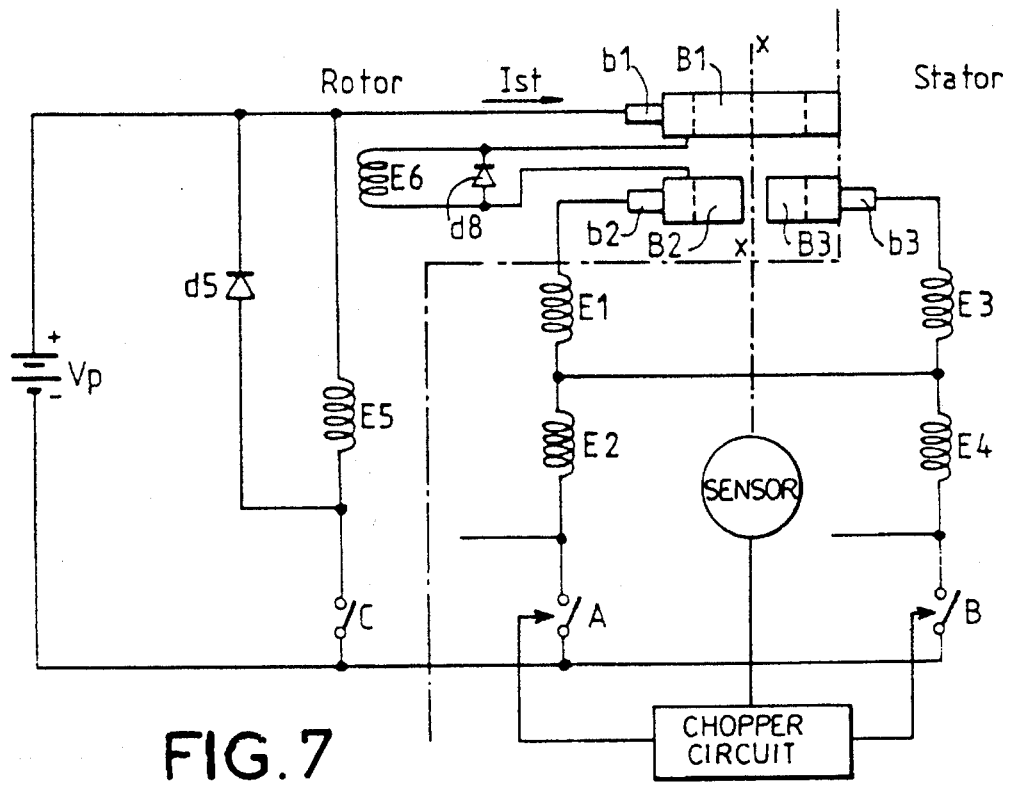
FIG. 7 shows a diagram of a variant of a motor according to the invention.

FIG. 7 represents a possible version of the compounding. The commutator device is identical to that of FIG. 6a but this is only an example.

A complementary rotor winding E6 is connected between the ring B1 and the first half-ring B2. It is crossed by the stator current. This complementary winding, placed at the rotor, increases the ampere-turns of the main rotor excitation winding E5. This possibility provides the motor with torque/speed and efficiency characteristics that are promising in terms of flexibility and energy savings.

A "free wheel" diode d8 provides for the protection of the choppers A and B and facilitates operation in generator mode.

What is claimed is:

1. A self-synchronous electrical motor comprising a rotor, a stator formed by stator windings, at least one electronic switch connected to a stator winding and activated by a chopper circuit at high frequency to control a mean current in the stator winding, a sensor of angular position of the rotor to control the chopper circuit, wherein said electrical motor comprises a mechanical commutator device rotating with the rotor, to shunt the current given by a power supply source into the stator windings selected as a function of the position of the rotor, the mechanical commutator device being interposed in a series circuit formed by the power supply source, the stator windings and the at least one electronic switch.

2. An electrical motor according to claim 1, where in the stator comprises at least four windings that are offset by 90 electrical degrees with respect to one another and are star-connected each having a free end, the mechanical commutator device being mounted between a first terminal of the power supply source and the free end of two of the windings, said at least one electronic switch and at least a second electronic switch being mounted respectively between the free end of each of the other two windings and a second terminal of the power supply source, so as to make the current pass successively into two windings in series taken from among the four, these two windings being offset by 90 electrical degrees.

3. An electrical motor according to one of the claims 1 or 2, wherein the mechanical commutator device comprises at least one ring and at least one brush that rubs against the ring.

4. An electrical motor according to claim 1 or 2, wherein the mechanical commutator device comprises a brush that is connected to the power supply source and that rubs constantly on a first ring driven by the rotor and two other brushes, each connected respectively to a stator winding, that rub alternately on a half-ring driven by the rotor and electrically connected to the first ring.

5. An electrical motor according to claim 1 or 2, wherein the commutator device comprises a fixed ring connected to the power supply source and two fixed half-rings, the first half-ring being connected to a first winding, the second half-ring being connected electrically to a second winding, a dual brush driven by the rotor rubbing of the ring and half-rings being designed for the short-circuiting firstly of the ring and first half-ring and, then, of the ring and second half-ring.

6. An electrical motor according to claim 1, wherein the rotor is a coiled winding and series-connected with an electronic switch associated with a chopper circuit to control the current flowing in the rotor.

7. An electrical motor according to claim 6, further comprising, a diode ($d_3$ or $d_4$) that is parallel-connected with the at least one electronic switch (A or B) connected to the stator winding ($E_2$ or $E_4$), said electronic switch being off, said diode ($d_3$ or $d_4$) letting current from said rotor winding ($E_5$) pass into said stator winding ($E_2$ or $E_4$) in a direction of charging said power supply source ($V_p$), whereby said motor works as a brake and a generator.

8. An electrical motor according to claim 6, with a rotor having at least one winding, wherein said motor comprises a compounding circuit formed by an additional winding at the rotor, this winding being supplied with stator current.

9. An electrical traction system, comprising a rechargeable supply source (VD), a self-synchronous motor with a rotor (E5) and a stator comprising windings (E1, E2, E3, E4) that are crossed and connectable to a current coming from the rechargeable source (Vp) to make the motor rotate, and at least one electronic switch (B) connected to one of said windings (E4) and activated by a chopper circuit at high frequency to control said current in said at least one of said windings (E4) when the motor is in operation, means (c1, c2, c3, c4, c5, c6) for reconnecting at least two of said windings (E1+E2, E3+ E4) and the at least one electronic switch (B) in order to recharge said rechargeable supply source (Vp), said reconnecting means connecting said windings into a primary winding (E3+E4) and a secondary winding (E1+E2) of a transformer when the motor is off, said primary winding (E3+E4) being connected to power mains and said secondary winding (E1+E2) being connected to said rechargeable supply source (Vp) through rectifier means (d1, d2, d3, d4), said at least one electronic switch (B) being series connected to said primary winding (E3+E4) of said transformer.

10. An electronic traction system according to claim 9 wherein said self synchronous motor comprises a mechanical commutator rotating with the rotor to route the current given by the supply source into the stator windings selected as a function of the position of the rotor, said mechanical commutator being interposed in a series-circuit formed by the supply source, the stator windings and said at least one electronic switch.

11. An electrical traction system according to claim 9, wherein said means for reconnecting at least two of said windings include contacts (c1, c2, c3, c4, c5, c6) said contacts working in a first mode when the motor rotates and in a second mode when the motor is off and the source (Vp) is recharging.

12. An electrical traction system, comprising a self synchronous motor having a rotor (E5), a stator having stator windings (E1, E2, E3, E4), at least one electronic switch (A or B) connected to a stator winding (E2 or E4) and activated by a chopper circuit at high frequency to control a mean current in said stator winding (E2 or E4), a sensor of angular position of said rotor (E5) to control said chopper circuit, a mechanical commutator device (a, b) rotating with said rotor (E5) to shunt the current given by said supply source (Vp) into said stator windings and interposed in a series circuit formed by said supply source, said stator windings and said at least one electronic switch, at least one additional winding (e1, e2, e3, e4) electromagnetically coupled to at least one of said stator windings, and a rectifier circuit (d6, d7) connected between the additional winding and a rechargeable auxiliary battery (Vs) whereby said auxiliary battery (Vs) is recharged.

* * * * *